(12) United States Patent
Bartl et al.

(10) Patent No.: US 9,109,460 B2
(45) Date of Patent: Aug. 18, 2015

(54) POWER HARVESTING BEARING CONFIGURATION

(71) Applicants: Frank Bartl, Grenzach-Wyhlen (DE); Andreas Clemens Van Der Ham, Utrecht (NL)

(72) Inventors: Frank Bartl, Grenzach-Wyhlen (DE); Andreas Clemens Van Der Ham, Utrecht (NL)

(73) Assignee: AKTIEBOLAGET SKF, Gothenborg (SE)

( * ) Notice: Subject to any disclaimer, the term of this patent is extended or adjusted under 35 U.S.C. 154(b) by 0 days.

(21) Appl. No.: 14/350,111

(22) PCT Filed: Sep. 27, 2012

(86) PCT No.: PCT/EP2012/069104
§ 371 (c)(1),
(2) Date: Apr. 7, 2014

(87) PCT Pub. No.: WO2013/050294
PCT Pub. Date: Apr. 11, 2013

(65) Prior Publication Data
US 2014/0348638 A1 Nov. 27, 2014

Related U.S. Application Data

(60) Provisional application No. 61/544,107, filed on Oct. 6, 2011.

(51) Int. Cl.
| | |
|---|---|
| *F16C 41/00* | (2006.01) |
| *F01D 15/10* | (2006.01) |
| *F16C 35/00* | (2006.01) |
| *F16C 37/00* | (2006.01) |
| *F01D 1/04* | (2006.01) |
| *F04D 29/05* | (2006.01) |
| *H02K 7/18* | (2006.01) |

(52) U.S. Cl.
CPC *F01D 15/10* (2013.01); *F01D 1/04* (2013.01); *F04D 29/05* (2013.01); *F16C 35/00* (2013.01); *F16C 37/00* (2013.01); *F16C 41/004* (2013.01); *H02K 7/1823* (2013.01)

(58) Field of Classification Search
CPC ........................................... F16C 41/00
USPC ............................................. 290/52
See application file for complete search history.

(56) References Cited

U.S. PATENT DOCUMENTS 5,440,184 A * 8/1995 Samy et al. ............... 310/90
5,585,711 A * 12/1996 Kemner et al. ........... 322/46

(Continued)

FOREIGN PATENT DOCUMENTS

| DE | 102009037424 A1 | 2/2011 |
| JP | 2009005430 A | 1/2009 |
| JP | 2010216651 A | 9/2010 |

*Primary Examiner* — Joseph Waks
(74) *Attorney, Agent, or Firm* — Bryan Peckjian; SKF USA Inc. Patent Dept.

(57) ABSTRACT

A power generating bearing assembly providing a bearing retained by a bearing housing. The bearing housing includes a bearing cooling passage system having at least one integrated liquid cooling passage integrated within the bearing housing. A turbine receiving bore is formed through the bearing housing, penetrating the integrated liquid cooling segment. A turbine assembly is inserted into the turbine receiving bore, positioning a turbine blade subassembly of the turbine assembly within the integrated liquid cooling passage, wherein fluid flowing within the integrated liquid cooling passage causes the blade subassembly to rotate. The rotation of the blade subassembly rotates an electric power generator to create electric power. The turbine assembly can include an electro-magnetic subassembly mounting plate, wherein the turbine subassembly is located on an interior surface of the mounting plate and at least a portion of the power generating portion located on an exterior portion of the mounting plate.

12 Claims, 5 Drawing Sheets

(56) References Cited

U.S. PATENT DOCUMENTS

| | | |
|---|---|---|
| 5,711,615 A | 1/1998 | Stitz et al. |
| 6,535,135 B1 * | 3/2003 | French et al. ................ 340/682 |
| 6,682,277 B2 * | 1/2004 | Endo et al. .................... 409/231 |
| 6,838,794 B2 * | 1/2005 | Iwamoto et al. ................ 310/90 |
| 2014/0348453 A1 * | 11/2014 | Bartl et al. .................... 384/476 |
| 2014/0348638 A1 * | 11/2014 | Bartl et al. .................... 415/116 |
| 2014/0360548 A1 * | 12/2014 | Bartl et al. .................... 136/205 |
| 2014/0367970 A1 * | 12/2014 | Van Der Ham et al. ........ 290/52 |

* cited by examiner

POWER HARVESTING BEARING CONFIGURATION

CROSS REFERENCE TO RELATED APPLICATIONS

This application is the U.S. National Stage of International Application No. PCT/EP2012/069104 filed on Sep. 27, 2012, which claims priority to U.S. patent application No. 61/544,107 US filed on Oct. 6, 2011.

TECHNICAL FIELD OF THE INVENTION

The present invention relates to an apparatus and method for generating power utilizing a cooling system integrated into a bearing or bearing housing.

BACKGROUND ART

Bearings are used to support many rotating objects. Bearings are commonly integrated into a variety of machines. The bearings are a key factor contributing to the reliability of the machine. The system designed commonly installs one or more bearing condition monitoring devices to ensure the bearings remain in working order. The majority of the condition monitoring devices requires low voltage electrical power for operation. Some systems include other components that also utilize electrical power.

Batteries provide a limited capacity, which dictates a limited supply and thus a limited run time. Obtaining power from a commercial utility source can be costly, particularly for remote installations. Transferring electrical power from a commercially available source can require running extensive and costly power cabling and support equipment. Maintenance of these systems must be considered. Replacement of batteries incurs both parts and labor costs. These concerns are aggravated for temporary installations.

A portion of the bearings generates a significant amount of heat. These bearings include heat dissipation or thermal transfer systems. One exemplary thermal transfer system includes one or more integrated liquid cooling passages. Liquid coolant is pumped through the integrated liquid cooling passages extracting heat from the bearing or bearing assembly.

Turbines are commonly used for a variety of applications. One application converts energy from a flowing liquid to electrical energy. A well-known example is a windmill. Another well-known example is a dam.

More compact, lower level power generators have been integrated into home appliances such as faucets, shower heads, and the like, where power is converted from the flowing water to electrical power, which is subsequently used to illuminate LED's.

A variety of parameters are monitored to continuously determine a condition of a bearing. The application of the bearing may limit the availability or ease of providing electrical power to the sensors used to monitor the condition of the bearing. What is desired is a power generating system that can be integrated into the bearing assembly to harvest power from the bearing assembly and utilize the harvested power to generate electrical energy.

DISCLOSURE OF THE INVENTION

The present invention is directed towards an apparatus and respective method for generating electrical energy utilizing a cooling system of a bearing or bearing assembly.

In a first aspect of the present invention, a power generating bearing assembly, the power generating bearing assembly comprising:
a bearing;
a bearing housing comprising:
a bearing receptacle,
at least one integrated liquid cooling passage; and
a turbine installation port extending between an exterior surface of the bearing housing and penetrating one of the integrated liquid cooling passages, wherein the turbine installation port is substantially perpendicular to the integrated liquid cooling passage;
a turbine assembly comprising: [0018] a turbine casing, [0019] a turbine shaft assembled within the turbine casing, [0020] a turbine blade subassembly rotationally carried by the turbine shaft, [0021] a turbine fluid passage passing through the turbine casing, the turbine fluid passage being oriented perpendicular to a rotational axis of the turbine blade subassembly, and [0022] an electrical generator in operational engagement with the turbine blade subassembly, wherein rotational motion of the turbine blade subassembly causes the electrical generator to generate electrical power;
wherein the turbine is inserted into the turbine installation port positioning the turbine fluid passage within the liquid cooling passage orienting the turbine blade subassembly to rotate about an axis that is perpendicular to a flow of fluid through the liquid cooling passage converting energy provided by fluid flowing through the liquid cooling passage to electrical energy.

In a second aspect, the turbine is installed orienting a rotational axis of the turbine substantially perpendicular to the direction of flow of the fluid.

In another aspect, an exterior surface of the turbine casing provides a seal for the turbine installation port.

In another aspect, a sealant material is placed between the exterior surface of the turbine casing and the turbine installation port to provides a seal therebetween.

In another aspect, the turbine casing and the turbine installation port comprise threaded surfaces enabling a threaded assembly therebetween.

In another aspect, the turbine further comprises an electrical conduit extending in electrical communication from the electrical generator.

In another aspect, the turbine casing is provided having a circular cross sectional shape.

In another aspect, the turbine casing is provided having a tubular cross sectional shape.

In another aspect, the turbine is installed aligning the turbine assembly centrally with a diameter of the liquid cooling passage.

In another aspect, the turbine is installed aligning the longitudinal axis of the turbine blade subassembly centrally with a diameter of the liquid cooling passage.

In another aspect, the turbine is installed proximate a cooling system inlet port.

In another aspect, the turbine is installed proximate a cooling system discharge port.

In another aspect, an electro-magnetic subassembly mounting plate can be integrated into the turbine assembly to aid in the installation of the turbine assembly within the bearing housing. The electro-magnetic subassembly mounting plate can further provide the functionality of a seal.

In another aspect, the electrical power generated is utilized to provide power to a separate electrically powered device.

In another aspect, the electrical power generated is utilized to power at least one bearing condition monitoring sensor.

In another aspect, the electrical power generated is utilized to power at least one bearing condition monitoring sensor associated with the same bearing assembly.

In another aspect, the electrical power generated is utilized to power at least one bearing condition monitoring sensor associated with the same bearing assembly and at least one bearing condition monitoring sensor associated with a separate bearing assembly located proximate the power generating bearing assembly.

One advantage of the present invention is the ability to modify an existing liquid cooled bearing assembly to receive a turbine assembly. The conversion from a standard liquid cooled bearing assembly to a power harvesting bearing assembly can be accomplished by machining a bore through the bearing housing, wherein the bore penetrates the integrated liquid cooling passage. The turbine assembly can be retained in position using an electro-magnetic subassembly mounting plate. The configuration enables a simplistic conversion as well as a design that accommodates servicing.

Another advantage of the present invention is the ability to generate a continued electrical current using a cooling system of a bearing assembly. One or more sensors can be employed to monitor a condition of a bearing. The sensors are commonly operated using electrical power. The sensors can monitor a variety of parameters to continuously determine a condition of a bearing. Communication devices could be employed as a vehicle to transfer information to a remote monitoring facility. These communication devices are also operated using electrical power. It is not uncommon where a system utilizing a bearing would be located in a remote area where sourcing electrical power could be difficult. Bearings can be utilized on equipment deployed in remote locations. The application of the bearing may limit the availability or ease of providing electrical power to the sensors used to monitor the condition of the bearing. The inclusion of an electrical power-generating device within a bearing system eliminates the need for an external source of electrical power. Additionally, by integrating the turbine assembly into the cooling system, the electrical energy is not drawing energy from the rotation of the bearing or other rotating elements of the system. Therefore, the turbine assembly is not impacting the efficiency of the rotating elements of the system.

Another advantage of the present invention is the flexibility for the installation. The installation can be accomplished by machining a turbine receiving bore through any suitable location along the cooling integrated liquid cooling segments. The turbine assembly would then be seated within the bore, positioning the turbine blade subassembly within the flow region of the integrated liquid cooling segment.

The location of condition monitoring sensors could complicate any provisions for externally provided power for monitoring the condition of the bearing. The bearing(s) can be integrated into the equipment at a location that is difficult to access, particularly for wiring. The inclusion of a power generator within the bearing assembly optimizes a source for electrical power at a location proximate the sensors or other equipment requiring the electrical power. This significantly reduces a length of wiring required. The reduced wiring avoids any accidentally interference or abrasion by any rotational movements or other movements of components of the equipment.

Another advantage of the present invention is the ability to deploy a temporary system having an integrated turbine for portable, monitored systems. The solution enables a complete stand-alone wireless system.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

MODES FOR CARRYING OUT THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
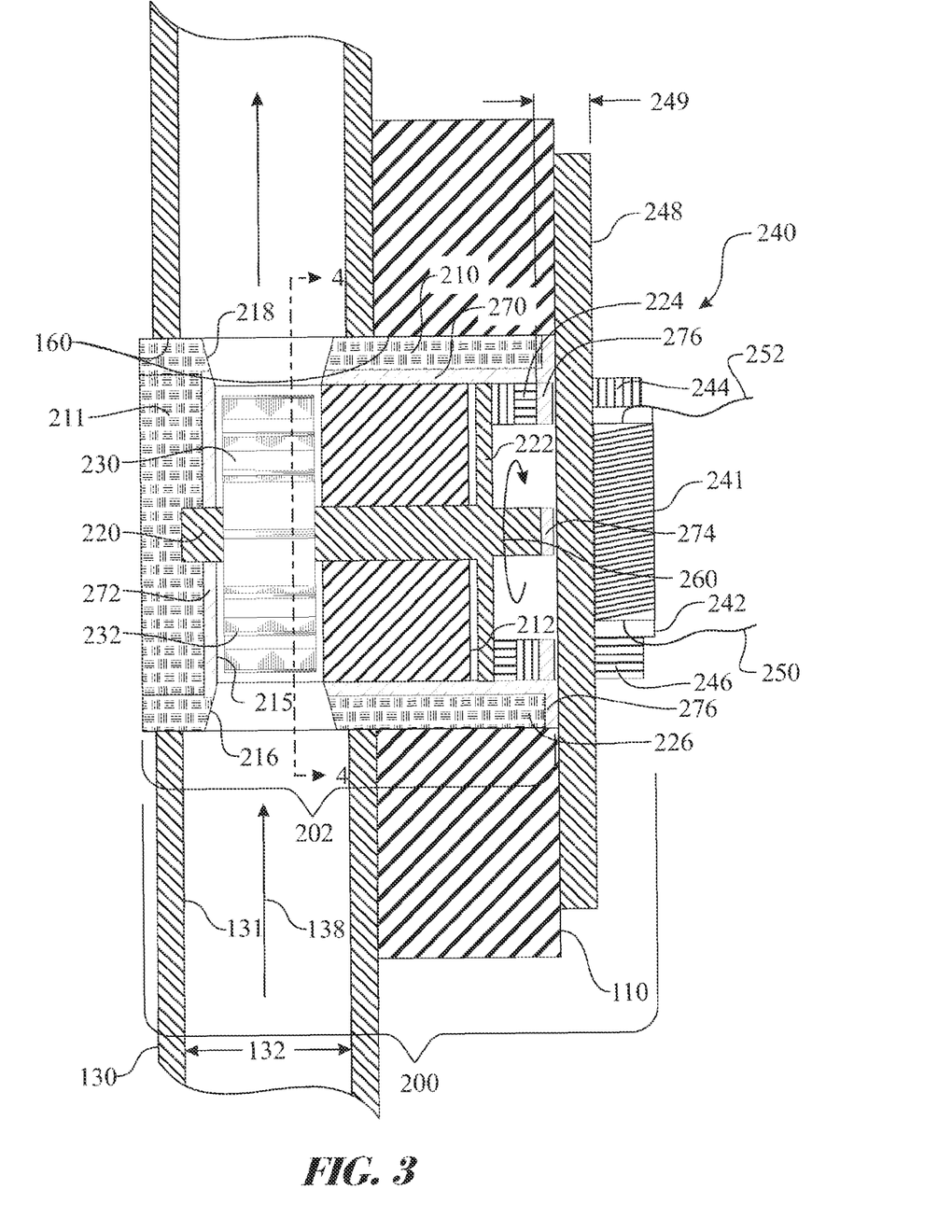
FIG. 3 presents a sectioned view of the installed exemplary turbine assembly, wherein the section taken along a plane formed by the longitudinal axis of the integrated liquid cooling segment and the rotational axis of the turbine blade subassembly.
Figure 4:
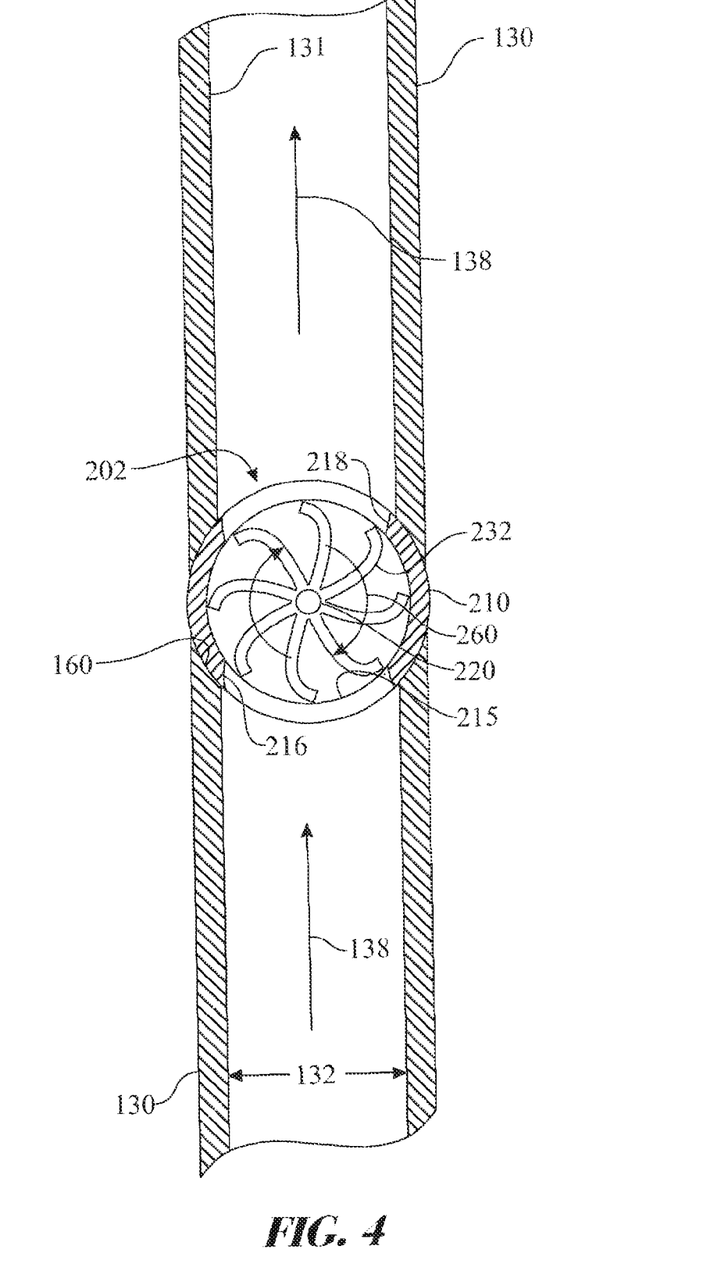
FIG. 4 presents a sectioned view of the installed exemplary turbine assembly, wherein the section is taken along a perpendicular to the rotational axis of the turbine blade subassembly, the section taken along section line 4-4 of FIG. 3.
Figure 5:
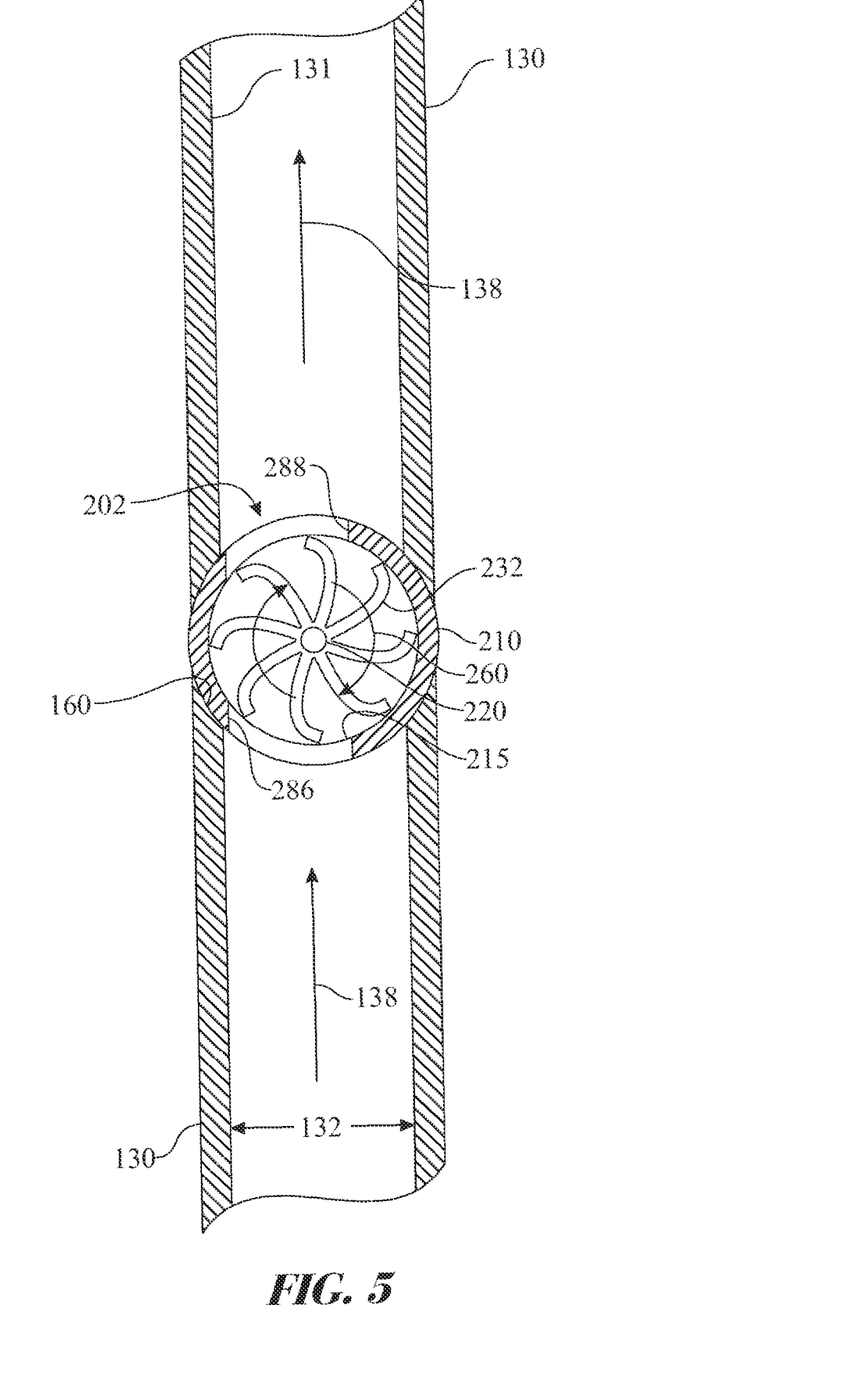
FIG. 5 presents a sectioned view of the installed exemplary turbine assembly having a modified fluid passage section, wherein the section is taken along a plane that is perpendicular to the rotational axis of the turbine blade subassembly, the section taken along section line 4-4 of FIG. 3.

A power harvesting bearing assembly 100 is illustrated in FIGS. 1 through 4, with a modified configuration being illustrated in FIG. 5. A power harvesting bearing assembly 100 includes a bearing 120 retained within a bearing housing 110 by a bearing receptacle 112. Bearing housings 110 are configured in a variety of form factors, having a multitude of optional configurations. One optional feature is an inclusion of an integrated bearing cooling passage system within the bearing housing 110. The optional integrated bearing cooling passage system provides a thermal transfer system to remove heat generated by the rotation of the bearing and/or other rotating components in contact with the bearing. The integrated bearing cooling passage system includes an integrated liquid cooling segment 130 defining an integrated liquid cooling passage 131 for passing a fluid therethrough in accordance with a fluid flow 138. The integrated bearing cooling system can include a single segment 130 or a series of coolant passage segments 130. An exemplary cooling system port 134 is shown at each end of the exemplary integrated liquid cooling segment 130, collectively forming an integrated bearing cooling system. One cooling system port 134 functions as a source port and the second cooling system port 134 functions as a return port. It is understood that the fluid flow 138 can flow in either direction, wherein the direction of flow would be determined by the installation. It is understood that the integrated bearing cooling system would additionally comprise a liquid coolant, a second heat exchanger to remove heat from the liquid coolant, and a pump for driving the liquid coolant through the integrated liquid cooling segments.

Figure 1:
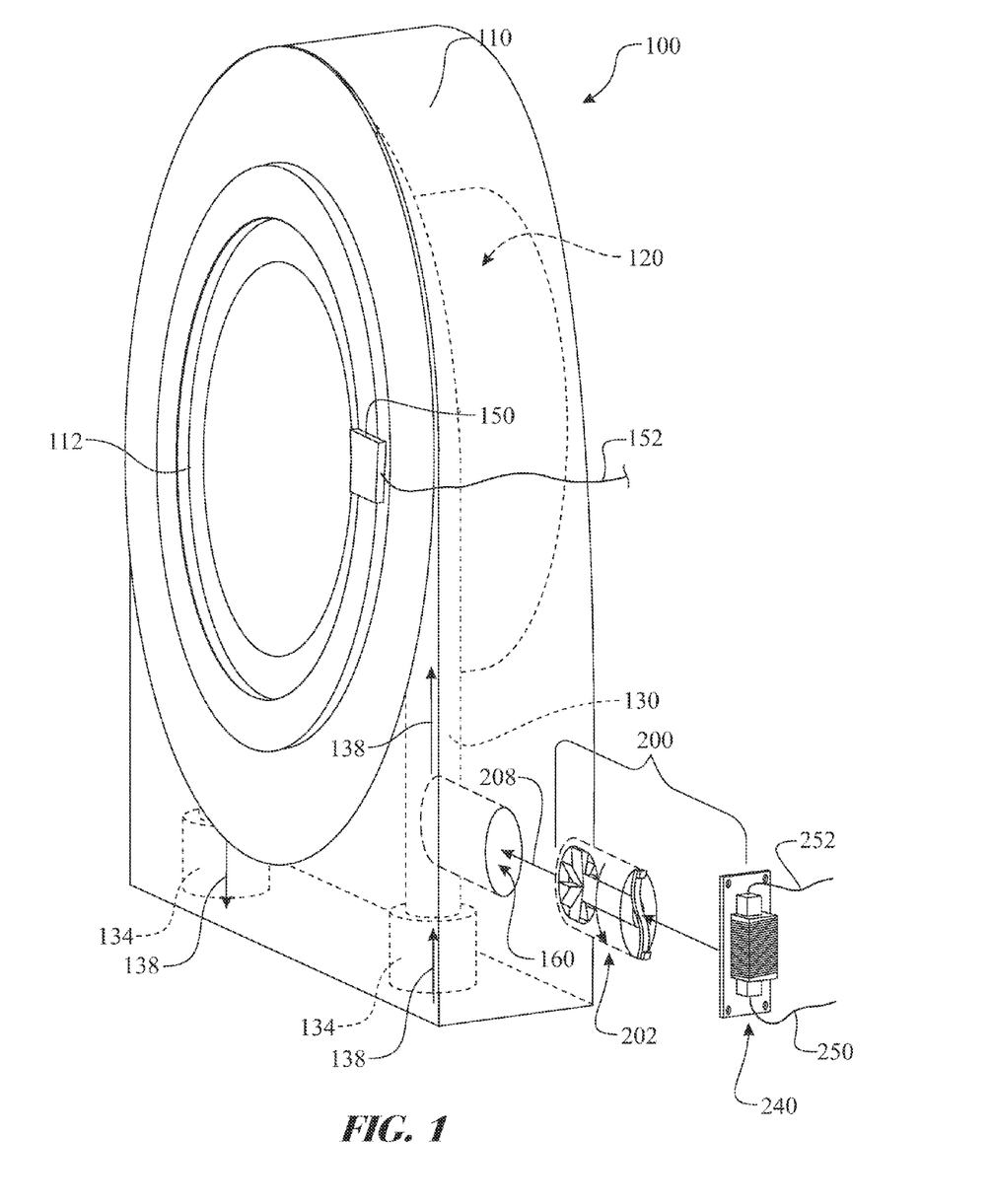
FIG. 1 presents an isometric assembly view of an exemplary turbine assembly being inserted into turbine receiving bore to position a turbine blade assembly within an integrated liquid cooling segment of a bearing housing.
Figure 2:
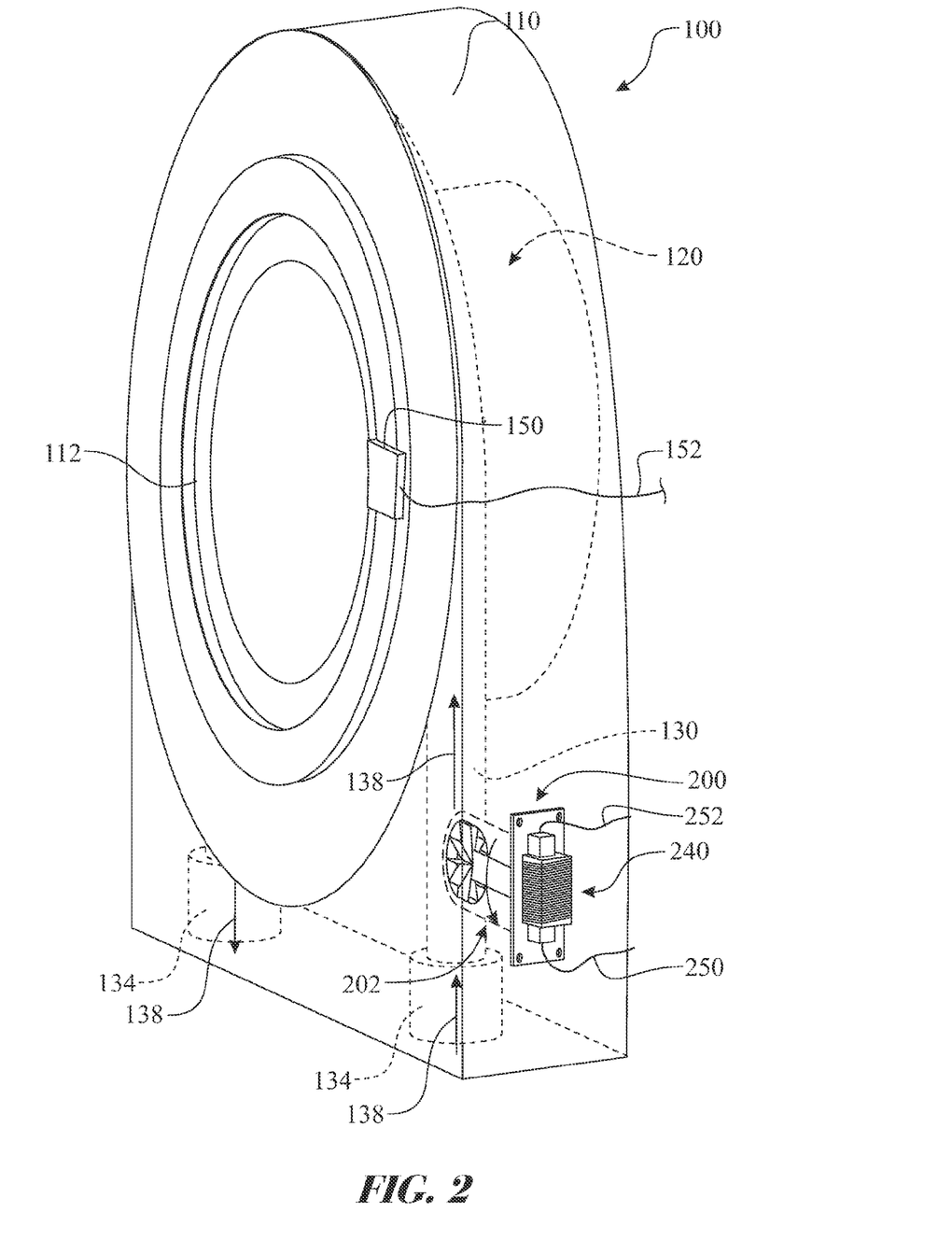
FIG. 2 presents an isometric view of the exemplary turbine assembly shown as installed within the turbine receiving bore positioning a turbine blade assembly within the integrated liquid cooling segment of a bearing housing.

A turbine receiving bore 160 is formed within the bearing housing 110 by machining a bore towards and penetrating the integrated liquid cooling segment 130. The desired location can be determined from the product design information, an X-Ray, higher technology such as acoustic sounding, and the like. In the exemplary embodiments, it is preferred that the turbine receiving bore 160 is centered across a cooling passage diameter 132 spanning between the tangent edges of the integrated liquid cooling segment integrated liquid cooling passage 131. The dimensions of the turbine receiving bore 160 are preferably suited for receiving the turbine casing 210. It is preferred that the turbine casing 210 is fabricated having a circular exterior circumference, and the turbine receiving bore 160 is formed using a drilling process. The diameter of the turbine receiving bore 160 would be respective to the diameter of the turbine casing 210 to provide a fluid seal when the turbine casing 210 is installed within the turbine receiving bore 160. It is understood that the exterior surface of the turbine casing 210 and the interior surface of the turbine receiving bore 160 could be threaded, enabling a threaded assembly between the two components. A sealant material can be placed about the threaded portions to enhance the seal therebetween.

The turbine assembly 200 can include an electro-magnetic subassembly mounting plate 248. A portion or all of the turbine subassembly 202 and electro-magnetic subassembly 240 can be assembled to the electro-magnetic subassembly mounting plate 248, simplifying the installation process. The turbine subassembly 202 would be inserted into the turbine receiving bore 160 in accordance with a turbine insertion 208. The electro-magnetic subassembly mounting plate 248 would be detachable secured to an exterior surface of the turbine casing 210. In one embodiment, the electro-magnetic subassembly mounting plate 248 can be detachable secured using a threaded fastener, such as screws, bolts, or any other threaded fastener (not shown but well understood by those skilled in the art).

A turbine assembly 200 is inserted within the turbine receiving bore 160 for harvesting power from fluid flowing through the integrated bearing cooling passage system. The turbine assembly 200 is oriented with an axis of rotation of each turbine blade subassembly 230 perpendicular to the fluid flow 138. Details of the turbine assembly 200 are presented in FIG. 3 and will be presented below.

The power harvesting bearing assembly 100 can include a condition sensor 150 or other electrically operated component. Electrical power is transferred from the turbine assembly 200 to the condition sensor 150 by connecting power supply conductors 250, 252 to a condition sensor wiring 152. The condition sensor wiring 152 provides an electrical communication channel between the condition sensor 150 and the power supply conductors 250, 252. It is understood that the turbine assembly 200 can provide electrical power to sensors 150 and other electrically operated component located in the general vicinity of the power harvesting bearing assembly 100, including bearing sensors located on other bearing assemblies; communication devices (wired or wireless); alarms; data recording devices (including computers, magnetic tape drives, digital recording devices, disc recording devices, and the like); controllers, and the like.

The turbine assembly 200 comprises elements of any electricity generating turbine assembly known by those skilled in the art. The exemplary embodiment of the turbine assembly 200 presented herein illustrates one embodiment to describe various elements, the components inter-relation, and function.

The turbine assembly 200 includes at least one turbine blade subassembly 230 rotationally assembled within a turbine casing 210. Each turbine blade subassembly 230 comprises a plurality of turbine blades 232. The turbine blades 232 are shaped to rotationally drive the turbine blade subassembly 230 when subjected to the fluid flow 138. The turbine blades 232 can be formed in any suitable shape and orientation, including angled, spiraling, and the like. The turbine blade subassembly 230 is assembled within the turbine casing 210 enabling the turbine blade subassembly 230 to rotate about a longitudinal axis of the turbine shaft 220. It is preferred that the turbine blade subassembly 230 is affixed to the turbine shaft 220, driving rotation of the turbine shaft 220 within the turbine casing 210. The turbine shaft 220 can be supported by at least one turbine axle bushing 212. The turbine axle bushing 212 can additionally provide functionality of a liquid seal. The turbine end of the turbine shaft 220 can be supported by a turbine axle bushing 212 of the turbine casing 210 or another feature acting as a bushing. It is understood that bearings can be used in place of the bushings to reduce friction when needed. Although the exemplary embodiment employs a bracket 212 in combination with a feature integrated into a turbine casing end wall 211, it is understood that the turbine shaft 220 can be rotationally assembled within an interior of the turbine casing 210 using any suitable mounting configuration. A turbine friction reduction lining 272 can be inserted between the adjacent surface of the turbine blade subassembly 230 and the turbine casing end wall 211. A magnet support member 222 is rotationally assembled within the turbine casing 210. The magnet support member 222 is rotationally driven by a rotation of the turbine blade subassembly 230, wherein the rotation is referenced as a turbine subassembly rotation 260. A pair of rotated magnets or magnetic material 224, 226 is carried by the magnet support member 222. The first rotated magnet 224 is carried at a first end of the magnet support member 222 and the second rotated magnet 226 is carried at a second end of the magnet support member 222. Alternatively, the magnet support member 222 can be fabricated of a magnetic material, wherein the rotated magnets 224, 226 would be representative of the magnetic polarity of the magnet support member 222. An electro-magnetic subassembly is secured within the turbine casing 210. The electro-magnetic subassembly comprises an electrical coil 241 wrapped about a coil core 242. A first coil core polarity 244 is carried at a first end of the coil core 242 and a second coil core polarity 246 is carried at a second end of the coil core 242. Alternatively, the coil core 242 would be fabricated of a magnetic material, wherein the fixed magnets 244, 246 would be representative of the magnetic polarity of the coil core 242. The assembly aligns each of the pair of rotated magnets or magnetic material 224, 226 with the pair of fixed magnets 244, 246. The magnets can be provided in opposing polarity to generate an alternating current. The rotation of the magnet support member 222 passes the rotated magnets or magnetic material 224, 226 across the pair of fixed magnets 244, 246 generating an alternating current. A pair of power supply conductors 250, 252 transfers the electrical power generated from the electrical coil 240 to a connector (not shown) for connection with an electrically powered device, such as the condition sensor 150. The turbine shaft 220 and magnet support member 222 can be fabricated of any suitable material. It is preferred that the turbine shaft 220 and magnet support member 222 are fabricated of non-magnetic materials, such as ceramic material, and the like.

A fluid transfer channel 215 is formed through the turbine casing 210, enabling fluid to pass therethrough. A turbine casing fluid inlet port 216 is provided at a first end of the fluid transfer channel 215 and a turbine casing fluid discharge port 218 is formed at a second end of the fluid transfer channel 215. Fluid would flow through the integrated liquid cooling segment integrated liquid cooling passage 131 in accordance with the fluid flow 138. The fluid would enter the turbine casing fluid inlet port 216, pass across the turbine blade subassembly 230 and exit through the turbine casing fluid discharge port 218. As the fluid passes through the fluid transfer channel 215, the fluid engages with the series of turbine blades 232 causing the turbine blade subassembly 230 to rotate about the longitudinal axis of the turbine shaft 220. Each of the turbine blades 232 can be shaped to direct the rotation in a predetermined direction, as illustrated in FIG. 4. It is understood that the turbine blades 232 can be formed in any shape suitable for the fluid flow within the integrated liquid cooling segment integrated liquid cooling passage 131.

The design of the fluid transfer channel 215 and respective fluid transition ports 216, 218 can be symmetric, as illustrated in FIG. 4 or asymmetric as illustrated in FIG. 5. The asymmetric fluid transition ports 286, 288 would be offset to ensure a proper torque is generated and applied to the turbine blade subassembly 230 to initiate the turbine subassembly rotation 260. A disadvantage of the offset ports 286, 288 is that the offset can introduce resistance to the flow of the fluid. An advantage of the offset ports 286, 288 is that the offset can enable the use of lower cost turbine blade assemblies 230.

Teflon or any other friction reducing lining 270 can be employed between the circumference of the turbine blade subassembly 230 and an interior surface of the turbine casing 210 to enhance a seal therebetween without increasing friction. The distance between the rotated magnets 224, 226 and the pair of fixed magnets 244, 246 directly affects the operation and efficiency of the electrical coil 240. The turbine shaft 220 is assembled within the turbine casing 210 to retain the dimensional relationship between the rotated magnets 224, 226 and the pair of fixed magnets 244, 246. The friction reducing material, more specifically a turbine axle friction reducing element 274, can be employed between a generator end of the turbine shaft 220 and the electro-magnetic subassembly mounting plate 248. The friction reducing material, referred to as a magnetic interface friction reducing element 276, can be employed between the rotated magnetic elements 224, 226 and the fixed magnetic elements 244, 246.

A rectifier can be inserted in electrical communication with the system to convert the alternating current to direct current.

The turbine assembly 200 is inserted within the turbine receiving bore 160 machined through the bearing housing 110 and penetrating the integrated liquid cooling segment integrated liquid cooling passage 131. The turbine receiving bore 160 is machined centered along the cooling passage diameter 132 spanning between the two edges of the integrated liquid cooling segment integrated liquid cooling passage 131. The turbine assembly 200 is inserted into the turbine receiving bore 160, locating the fluid transfer channel 215 preferably centered along the center of flow within the integrated liquid cooling segment integrated liquid cooling passage 131. The turbine casing fluid inlet port 216 and turbine casing fluid discharge port 218 can be linear or tapered (as illustrated). The turbine subassembly 202 is rotated aligning each of the turbine casing fluid ports 216, 218 with the integrated liquid cooling segment integrated liquid cooling passage 131. The turbine subassembly 202 can include a reference to identify the orientation of the turbine casing fluid ports 216, 218 to aid in the alignment process. The exemplary embodiment illustrated in FIG. 4 requires each turbine blade 232 to be shaped to create a rotation when the entire face is subjected to the fluid flow. The exemplary embodiment illustrated in FIG. 5 offsets the turbine casing fluid ports 286, 288, wherein one edge of each turbine casing fluid port 286, 288 is closer to the center of rotation of the turbine blade subassembly 230. The offset directs the flow toward one side of the turbine blade subassembly 230, creating an offset force. The offset force generates a torque, which causes the turbine blade subassembly 230 to rotate. This configuration broadens the options for designs of the turbine blade subassembly 230.

The turbine subassembly 202 can be retained within the turbine receiving bore 160 using any mechanical attachment configuration known by those skilled in the art. The exemplary embodiment utilizes an electro-magnetic subassembly mounting plate 248. The electro-magnetic subassembly mounting plate 248 is fabricated of a non-magnetic material, enabling the magnetic flux to pass therethrough. The designer should consider the thickness of the electro-magnetic subassembly mounting plate 248 to optimize the interaction between the magnets. One suggested magnetic gap 249 is 5 mm. In a condition where the magnets are too close, the magnetic attraction will impact the rotation of the magnet support member 222. In a condition where the magnets are too far apart, the magnetic attraction will not be sufficient enough to generate the necessary current within the electrical coil 241 to create the desired power output. The electro-magnetic subassembly 240 is attached to an exterior surface of the electro-magnetic subassembly mounting plate 248. This configuration eliminates a requirement for passing the power supply conductors 250, 252 from within an area exposed to fluid, thus eliminating any risk of a fluid leak related to a passage for the power supply conductors 250, 252.

The turbine casing 210 can be carried by an interior surface of the electro-magnetic subassembly mounting plate 248. This configuration creates a single assembly, simplifying the installation and removal of the turbine assembly 200 from the bearing housing 110.

The turbine receiving bore 160 can be sealed using any sealing process known by those skilled in the art. One exemplary process would be to insert a sealant between the exterior of the turbine casing 210 and the interior of the turbine receiving bore 160. This can be a gasket sleeve, a liquid compound, and the like. The exterior of the turbine casing 210 and the interior of the turbine receiving bore 160 can be threaded, providing a threaded assembly interface. A sealant, such as pipe tape, threadlock, and the like can be employed within the threaded interface to seal the threaded joint. A seal can be placed between the interior (contacting) surface of the 248 electro-magnetic subassembly mounting plate 248 and the exterior surface of the bearing housing 110. It is understood that more permanent joint compounds can be employed, although this option limits servicing options.

In operation, fluid flows through the integrated liquid cooling segment integrated liquid cooling passage 131 in accordance with the fluid flow 138. The flowing fluid enters the fluid transfer channel 215 by passing through the turbine casing fluid inlet port 216. The flowing fluid causes the turbine blade subassembly 230 to rotate. The rotation of the turbine blade subassembly 230 drives rotation of an electric generator. The electric generator can be of any known suitable form factor. The exemplary electric generator includes a pair of magnets 224, 226 located at distal ends of the magnet support member 222. The magnets 224, 226 interact with a pair of fixed magnets 244, 246 or polarized ends of a coil core 242. Changes in the magnetic flux density resulting from the rotating magnets 224, 226 passing the fixed magnets 244, 246 creates a current in the electrical coil 241. The current is transferred through a pair of power supply conductors 250, 252. The power supply conductors 250, 252 are provided in electrical communication with electrically operated devices, such as the condition sensor 150. It is understood that the electrical power generated by the electro-magnetic subassembly 240 can be used to power any electrically operated device capable of operating on the power output rating of the generator.

The design of the turbine assembly 200 can be optimized for efficiency based upon the application.

The components of the turbine assembly 200 can be treated for consideration of their working environment. Since the turbine assembly 200 will be subjected to flowing fluid, the electrical components are treated accordingly, such as being potted, coating with a conformal coating, and the like to avoid corrosion and/or premature failure to ensure long term reliability.

One skilled in the art can appreciate that the present invention can be adapted to a liquid or gas cooling system. The system can be operated using medium pressure and medium flow rates to harvest enough energy to power the condition sensor and other low power devices.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

| Ref. No. | Description |
| --- | --- |
| 100 | power harvesting bearing assembly |
| 110 | bearing housing |
| 112 | bearing receptacle |
| 120 | bearing |
| 130 | integrated liquid cooling segment |
| 131 | integrated liquid cooling passage |
| 132 | cooling passage diameter |
| 134 | cooling system port |
| 138 | fluid flow |
| 150 | condition sensor |
| 152 | condition sensor wiring |
| 160 | turbine receiving bore |
| 200 | turbine assembly |
| 202 | turbine subassembly |
| 208 | turbine insertion |

-continued

| Ref. No. | Description |
| --- | --- |
| 210 | turbine casing |
| 211 | turbine casing end wall |
| 212 | turbine axle bushing |
| 215 | fluid transfer channel |
| 216 | turbine casing fluid inlet port |
| 218 | turbine casing fluid discharge port |
| 220 | turbine shaft |
| 222 | magnet support member |
| 224 | first rotated magnet |
| 226 | second rotated magnet |
| 230 | turbine blade subassembly |
| 232 | turbine blades |
| 240 | electro-magnetic subassembly |
| 241 | electrical coil |
| 242 | coil core |
| 244 | first coil core polarity |
| 246 | second coil core polarity |
| 248 | electro-magnetic subassembly mounting plate |
| 249 | magnetic gap |
| 250 | first power supply conductor |
| 252 | second power supply conductor |
| 260 | turbine subassembly rotation |
| 270 | friction reducing lining |
| 272 | turbine friction reduction lining |
| 274 | turbine axle friction reducing element |
| 276 | magnetic interface friction reducing element |
| 286 | turbine casing fluid inlet port |
| 288 | turbine casing fluid discharge port |

What is claimed is:

1. A power generating bearing assembly, the power generating bearing assembly comprising:
 a bearing;
 a bearing housing comprising:
  a bearing receptacle, and
  at least one integrated liquid cooling passage; and
  a turbine installation port extending inward from an exterior surface of the bearing housing and penetrating one of the integrated liquid cooling passages, wherein the turbine installation port is formed substantially perpendicular to the integrated liquid cooling passage;
 a turbine assembly comprising:
  a turbine casing,
  a turbine shaft assembled within the turbine casing,
  a turbine blade subassembly rotationally carried by the turbine shaft,
  a turbine fluid passage passing through the turbine casing, the turbine fluid passage being oriented perpendicular to a rotational axis of the turbine blade subassembly, and
  an electrical generator in operational engagement with the turbine blade subassembly, wherein rotational motion of the turbine blade subassembly causes the electrical generator to generate electrical power;
 wherein the turbine assembly is inserted into the turbine installation port positioning the turbine fluid passage within the liquid cooling passage orienting the turbine blade subassembly to rotate about an axis that is perpendicular to a flow of fluid through the liquid cooling passage converting energy provided by fluid flowing through the liquid cooling passage to electrical energy.

2. The power generating bearing assembly as recited in claim 1, wherein the turbine receiving bore is formed having a circular cross sectional shape.

3. The power generating bearing assembly as recited in claim 2, wherein the turbine casing (210) further comprises a circular exterior circumferential shape, and wherein the turbine casing is sized to be inserted into the circular turbine receiving bore.

4. The power generating bearing assembly as recited in claim 1, wherein the turbine receiving bore is centered along a diameter of the integrated liquid cooling passage.

5. The power generating bearing assembly as recited in claim 4, the electric generating component being located on an exterior surface of the electro-magnetic subassembly mounting plate.

6. The power generating bearing assembly as recited in claim 5, the turbine casing is carried by the electro-magnetic subassembly mounting plate.

7. The power generating bearing assembly as recited in claim 5, the turbine casing is assembled to an interior surface of the electro-magnetic subassembly mounting plate.

8. The power generating bearing assembly as recited in claim 1, the electrical generator further comprises an electric generating component being carried by an electro-magnetic subassembly mounting plate.

9. The power generating bearing assembly as recited in claim 1, wherein turbine casing further comprises a turbine casing fluid inlet port and a turbine casing fluid discharge port, the turbine casing fluid inlet port (216) and the turbine casing fluid discharge port (218) defining each end of the fluid transfer channel, the turbine casing fluid inlet port and turbine casing fluid discharge port having a defined center that is in registration with a rotational axis of the turbine blade subassembly.

10. The power generating bearing assembly as recited in claim 1, wherein the turbine casing further comprises a turbine casing fluid inlet port and a turbine casing fluid discharge port, the turbine casing fluid inlet port and the turbine casing fluid discharge port defining each end of the fluid transfer channel, the turbine casing fluid inlet port and turbine casing fluid discharge port having a defined center that is offset from a rotational axis of the turbine blade subassembly.

11. The power generating bearing assembly as recited in claim 1, the electrical generator further comprising a magnet support member in rotational connection with the turbine blade subassembly;
    at least one rotated magnetic element carried by the magnet support member; and
    an electrical coil having a series of coil windings circumscribing a coil core, wherein the coil core is in magnetic communication with the at least one rotated magnetic element,
    wherein when the rotational interaction between the at least one rotated magnetic element and the coil core causes the electrical coil to generate an electrical output.

12. The power generating bearing assembly as recited in claim 1, wherein the turbine casing further comprises a turbine casing end wall, the turbine casing end wall sealing a turbine end of the turbine casing.

\* \* \* \* \*